US007199296B2

(12) United States Patent
Scott

(10) Patent No.: US 7,199,296 B2
(45) Date of Patent: Apr. 3, 2007

(54) SNARE DRUM DEVICE

(76) Inventor: Carl Scott, 3326 Hollyberry Dr., Vista, CA (US) 92084

(*) Notice: Subject to any disclaimer, the term of this patent is extended or adjusted under 35 U.S.C. 154(b) by 152 days.

(21) Appl. No.: 10/936,277

(22) Filed: Sep. 7, 2004

(65) Prior Publication Data

US 2005/0223874 A1 Oct. 13, 2005

Related U.S. Application Data

(60) Provisional application No. 60/560,577, filed on Apr. 7, 2004.

(51) Int. Cl.
*G01D 13/02* (2006.01)

(52) U.S. Cl. ........................................ 84/415; 411/301

(58) Field of Classification Search ................ 411/301; 84/415

See application file for complete search history.

(56) References Cited

U.S. PATENT DOCUMENTS 3,285,310 A * 11/1966 Boots et al. ................ 411/301
3,552,467 A * 1/1971 Bergere ...................... 411/301
3,661,048 A * 5/1972 Judd .......................... 411/337
3,897,713 A * 8/1975 Gugle ........................ 411/389
4,033,393 A * 7/1977 Bedi .......................... 411/301
4,120,993 A * 10/1978 Duffy et al. ................ 427/195
4,850,258 A 7/1989 Hoshino et al.
5,000,636 A * 3/1991 Wallace ...................... 411/258
6,025,019 A * 2/2000 Duffy ........................ 427/195
6,172,288 B1 1/2001 Freer
7,025,552 B2 * 4/2006 Grubert et al. ............ 411/546

* cited by examiner

*Primary Examiner*—Gary F. Paumen
(74) *Attorney, Agent, or Firm*—Mayer & Williams PC; Mark D. Welczonek, Esq.

(57) ABSTRACT

A device for tension rods or attachment bolts for snare drums. The threaded tension rod or bolt may be a threaded locking bolt. In this way, the vibration caused by use of the drum does not lead to disengagement of the attachment means, or disengagement of the nuts from the tension rods. In these self-locking bolts, tension rods, or fasteners, a portion of the helical screw thread is replaced with a pliant member such as a polymer, and when the fastener is tightened, the polymer friction-fits to the threaded hole within the attachments means or nuts, rendering the fastener difficult to remove.

20 Claims, 2 Drawing Sheets

SNARE DRUM DEVICE

CROSS-REFERENCE TO RELATED APPLICATIONS

This application is a U.S. Provisional Patent Application Ser. No. 60/560,577, filed Apr. 7, 2004.

FIELD OF THE INVENTION

The invention relates to devices for use with snare drums.

BACKGROUND OF THE INVENTION

A snare drum is a drum fitted with snares to produce a rattling effect. A snare is any of the cords stretched across the bottom skin of a drum so that when the drum is struck, a rattling sound is made. The cords may be made of, e.g., cable, gut or wire.

A typical snare drum, as described in U.S. Pat. No. 6,172,288, includes a shell having a batter end and an oppositely disposed snare end. A batter head is attached to the batter end by a batter rim and a snare head is attached to the snare end by a snare rim. The batter rim and the snare rim are pulled toward one another by tension rods that are aligned and held in place by passing through lugs that are attached to the shell. The rims are positioned over the batter end and the snare end, so that tension rods are aligned with apertures formed in the rims. The tension rods are received through the apertures, and nuts threadingly engage tension rods pulling the rims toward one another, thereby fastening the batter head and the snare head to the batter end and the snare end, respectively. The snare rim is formed to include a snare gate having an aperture therein through which the snares can pass. A strainer is provided to apply tension to the snares or to release the amount of tension being applied thereto.

As another example, and referring to the prior art FIG. 1 from U.S. Pat. No. 4,850,258, a snare drum 10 has an upper drum head (not shown), a lower drum head 13. The upper drum head and the lower drum head 13 attach to the drum body 11 via an upper drum hoop 14 and lower drum hoop 15, respectively, and each does so by cooperatively engaging a plurality of attachment bolts P1 through PN (PN is general and arbitrary and is not shown). Attachment bolts P1 through PN screw into attachment means Q1 through QN (QN is general and arbitrary and is not shown).

As shown in FIG. 1, attachment means 21 may threadingly accepts a bolt P5 which has previously threadingly engaged a hoop opening 22. Either or each threading engagement may be replaced by a threaded nut-and-bolt system as well.

A snappy 120 with sound wires 121 is secured over the lower drum head 13, the snappy 120 having a switch side extension 125 with switch 126.

SUMMARY OF THE INVENTION

A device for tension rods or attachment bolts for snare drums. The threaded tension rod or bolt may be a threaded locking bolt. In this way, the vibration caused by use of the drum does not lead to disengagement of the attachment means, or disengagement of the nuts from the tension rods. In these self-locking bolts, tension rods, or fasteners, a portion of the helical screw thread is replaced with a pliant member such as a polymer, and when the fastener is tightened, the polymer friction-fits to the threaded hole within the attachments means or nuts, rendering the fastener difficult to remove.

In one aspect, the invention is related to a device to secure a snare drum head, including: a drum body having a first end; a beaten drum head for extending over and being attached over the first end of the drum body; a hoop around the drum body located toward the end of the drum body; means on the beaten drum head for being engaged by the hoop such that when the hoop is moved away from the drum body first end, the beaten drum head is stretched; the drum body having a plurality of drum hoop attachment means spaced around the drum body; the hoop also having the same number of hoop attachment means as are provided on the drum body and placed so that the attachment means on the hoop may be positioned over the attachment means on the drum body, and a respective connecting means between each attachment means on the drum body and the respective attachment means on the hoop; each connecting means being tightenable for pulling the hoop along the drum body away from the drum body first end for stretching and tightening the beaten drum head; and the connecting means including a self-locking bolt.

Implementations of the invention may include one or more of the following. The drum body may have a second opposite end, a second drum head over the second end of the drum body, and means attaching the second drum head to the drum body. The attachment means for the second drum head may include a second hoop around the drum body located toward the second end; second hoop attachment means defined on and uniformly equally spaced around the drum body; the second hoop also having the same number of second hoop attachment means as the second hoop attachment means on the drum body, and a respective second connecting means between each second attachment means on the drum body and respective second attachment means on the second hoop for drawing the second hoop away from the second end of the drum body, for stretching and tightening the second drum head. The second connecting means may include a self-locking bolt. Each of the connecting means between each of the respective attachment means on the drum body and the attachment means on the hoop may include a self-locking bolt extending from the attachment means on the drum body and a bolt receptacle on the hoop for receiving the bolt and for tightening the bolt for drawing the hoop toward the attachment means on the drum body. The self-locking bolt may threadingly engage the bolt receptacle, the attachment means, or both. The self-locking bolt may include a threaded bolt with a dot or strip of polymer substituted therein for a section of the threads. A sound wire or plurality thereof may be attached to the drum body, extending across the outside of the second drum head diametrically across the center thereof. The number of attachment means for the hoop of the beaten drum head is approximately the same number as the attachment means for the hoop of the second drum head. The self-locking bolt may be magnetized.

In another aspect, the invention is related to a device to secure a snare drum head, including: a drum body having a first end; a beaten drum head for extending over and being attached over the first end of the drum body; a hoop around the drum body located toward the end of the drum body; means on the beaten drum head for being engaged by the hoop such that when the hoop is moved away from the drum body first end, the beaten drum head is stretched; the drum body having a plurality of drum hoop attachment means spaced around the drum body; the hoop also having the same number of hoop attachment means as are provided on the drum body and placed so that the attachment means on the hoop may be positioned over the attachment means on the drum body, and a respective connecting means between each attachment means on the drum body and the respective attachment means on the hoop; each connecting means being tightenable for pulling the hoop along the drum body away from the drum body first end for stretching and tightening the beaten drum head; and the connecting means including a magnetized bolt.

DETAILED DESCRIPTION

A difficulty in the above prior art system is that the combination of vibration causing by use of the drum and tension applied by the bolts, or by the tension rods, often leads to disengagement of the attachment means, or disengagement of the nuts from the tension rods. In other words, after use, the nuts or bolts tend to unscrew, leading to a modification of the drum sound or even disassembly of the drum.

Figure 1:
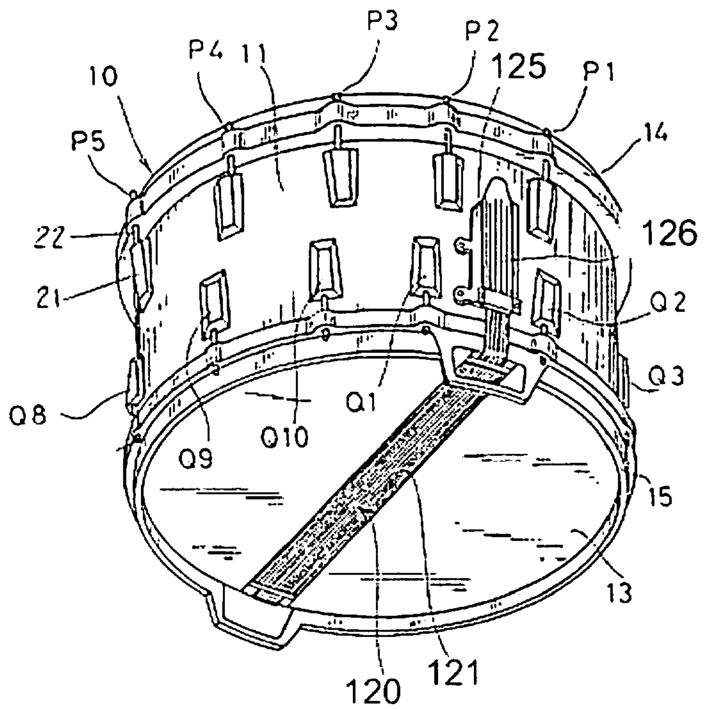
FIG. 1 [PRIOR ART]
FIG. 1 shows a prior art snare drum.
Figure 2:
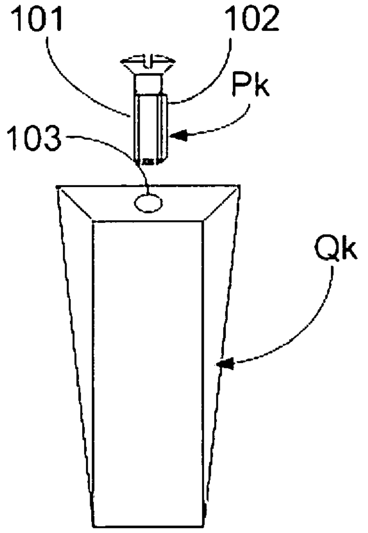
FIG. 2 shows an attachment device according to an embodiment of the current invention.

In the current snare drum, the threaded screw may be a threaded locking screw as is shown in FIG. 2. Appropriate self-locking screws may be such as those produced by the Long-Lok company of Cincinnati, Ohio. In these self-locking fasteners Pk, a portion of the helical screw thread 101 is replaced with a polymer 102, and when the fastener is tightened, the polymer friction-fits to the threaded hole 103 within Qk, rendering the fastener Pk difficult to remove.

This has a beneficial effect in the current situation. The vibration of the drum during use or otherwise no longer leads to loosening of the nut, or in this case, the screw. The screw substantially maintains its position, and the drum substantially maintains its sound.

Figure 3:
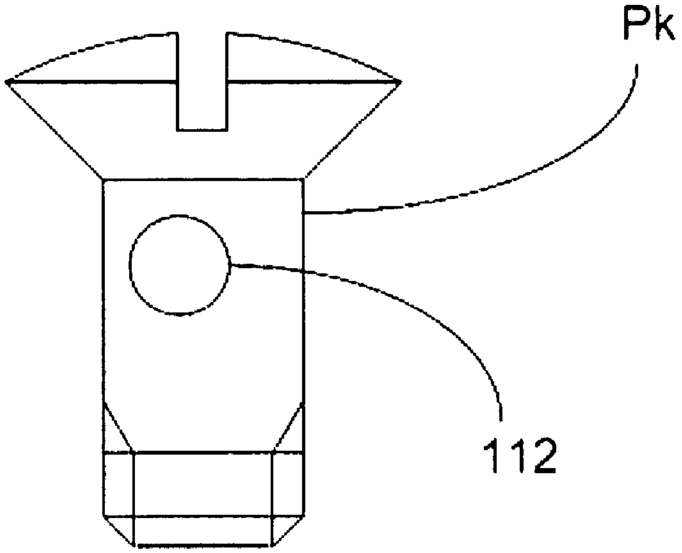
FIG. 3 shows an attachment bolt with a "dot" geometry polymer according to an embodiment of the current invention.
Figure 4:
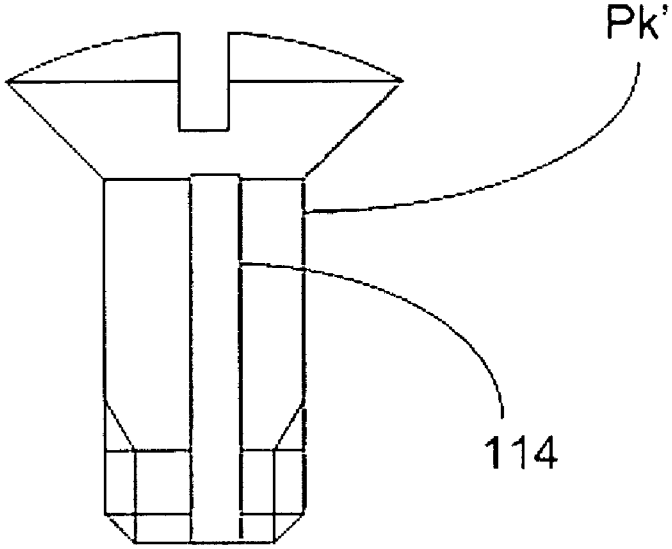
FIG. 4 shows an attachment bolt with a "strip" geometry polymer according to an embodiment of the current invention.

Embodiments of the self-locking fastener are manifold. The self-locking fastener may be a large "dot" of polymer 112 where the thread used to be (see FIG. 3), or the same may be a longitudinally-oriented strip of polymer 114 in the direction of the axis of the screw (see FIG. 4), or any other shape that would provide a self-locking feature.

Of course, the polymer may be replaced with another pliant material, so long as the same is capable of substantially preventing undesired rotation of the screw.

Figure 5:
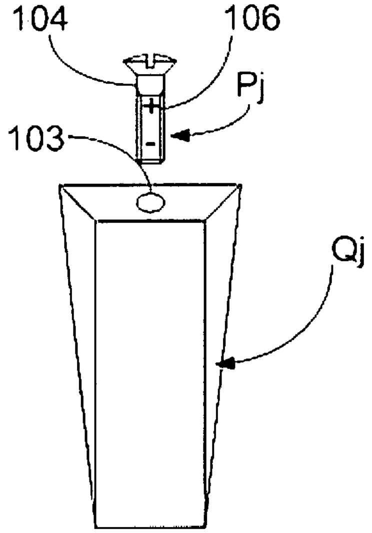
FIG. 5 shows another embodiment of an n attachment device according to the current invention.

In another embodiment, and referring to FIG. 5, in addition to or instead of a self-locking fastener, the screw Pj may be made of a magnetic material indicated by poles 106. The force of magnetic attraction between the screw poles 106 and the rim of the drum, the attachment means Qj, or the lug may have two benefits. First, the screw would be made more difficult to remove. Second, the screw would, in the event the same did vibrate loose, would stand a chance of attaching itself to a portion of the drum, rather than falling on the floor. In this case, the likelihood of loss of the screw, a current problem, would be lessened.

The invention has been described with respect to certain embodiments. However, the scope of the invention is to be defined only by the scope of the appended claims.

What is claimed is:

1. A device to secure a snare drum head, comprising: a drum body having a first end; a beaten drum head for extending over and being attached over the first end of the drum body; a hoop around the drum body located toward the end of the drum body; means on the beaten drum head for being engaged by the hoop such that when the hoop is moved away from the drum body first end, the beaten drum head is stretched; the drum body having a plurality of drum hoop attachment means spaced around the drum body; the hoop also having the same number of hoop attachment means as are provided on the drum body and placed so that the attachment means on the hoop may be positioned over the attachment means on the drum body, and a respective connecting means between each attachment means on the drum body and the respective attachment means on the hoop; each connecting means being tightenable for pulling the hoop along the drum body away from the drum body first end for stretching and tightening the beaten drum head; and the connecting means including a self-locking bolt.

2. The device to secure a snare drum head of claim 1, wherein the drum body has a second opposite end, a second drum head over the second end of the drum body and means attaching the second drum head to the drum body.

3. The device to secure a snare drum head of claim 2, wherein the attachment means for the second drum head comprises a second hoop around the drum body and located toward the second end; second hoop attachment means defined on and uniformly equally spaced around the drum body; the second hoop also having the same number of second hoop attachment means as the second hoop attachment means on the drum body, and a respective second connecting means between each second attachment means on the drum body and respective second attachment means on the second hoop for drawing the second hoop away from the second end of the drum body, for stretching and tightening the second drum head.

4. The device to secure a snare drum head of claim 3, wherein the second connecting means includes a self-locking bolt.

5. The device to secure a snare drum head of claim 1, wherein each of the connecting means between each of the respective attachment means on the drum body and the attachment means on the hoop comprises a self-locking bolt extending from the attachment means on the drum body and a bolt receptacle on the hoop for receiving the bolt and for tightening the bolt for drawing the hoop toward the attachment means on the drum body.

6. The device to secure a snare drum head of claim 1, wherein the self-locking bolt threadingly engages the bolt receptacle.

7. The device to secure a snare drum head of claim 1, wherein the self-locking bolt threadingly engages the attachment means.

8. The device to secure a snare drum head of claim 6, wherein the self-locking bolt further threadingly engages the attachment means.

9. The device to secure a snare drum head of claim 1, wherein the self-locking bolt includes a threaded bolt with a dot of polymer substituted therein for a section of the threads.

10. The device to secure a snare drum head of claim 1, wherein the self-locking bolt includes a threaded bolt with a strip of polymer substituted therein for a section of the threads.

11. The device to secure a snare drum head of claim 1, further comprising an additional sound wire attached to the drum body, extending across the outside of the second drum head diametrically across the center thereof.

12. The device to secure a snare drum head of claim 11, wherein there are a plurality of the additional sound wires in the form of a snappy extending diametrically across the second drum head.

13. The device to secure a snare drum head of claim 3, wherein the number of attachment means for the hoop of the beaten drum head is approximately the same number as the attachment means for the hoop of the second drum head.

14. The device of claim 1, wherein the self-locking bolt is magnetized.

15. A device to secure a snare drum head, comprising: a drum body having a first end; a beaten drum head for extending over and being attached over the first end of the drum body; a hoop around the drum body located toward the end of the drum body; means on the beaten drum head for being engaged by the hoop such that when the hoop is moved away from the drum body first end, the beaten drum head is stretched; the drum body having a plurality of drum hoop attachment means spaced around the drum body; the hoop also having the same number of hoop attachment means as are provided on the drum body and placed so that the attachment means on the hoop may be positioned over the attachment means on the drum body, and a respective connecting means between each attachment means on the drum body and the respective attachment means on the hoop; each connecting means being tightenable for pulling the hoop along the drum body away from the drum body first end for stretching and tightening the beaten drum head; and the connecting means including a magnetized bolt.

16. The device to secure a snare drum head of claim 15, wherein each of the connecting means between each of the respective attachment means on the drum body and the attachment means on the hoop comprises a magnetized bolt extending from the attachment means on the drum body and a bolt receptacle on the hoop for receiving the bolt and for tightening the bolt for drawing the hoop toward the attachment means on the drum body.

17. The device to secure a snare drum head of claim 15, wherein the magnetized bolt threadingly engages the bolt receptacle.

18. The device to secure a snare drum head of claim 15, wherein the magnetized bolt threadingly engages the attachment means.

19. The device to secure a snare drum head of claim 6, wherein the magnetized bolt further threadingly engages the attachment means.

20. The device to secure a snare drum head of claim 15, further comprising an additional sound wire attached to the drum body, extending across the outside of the second drumhead diametrically across the center thereof.

* * * * *